UNITED STATES PATENT OFFICE.

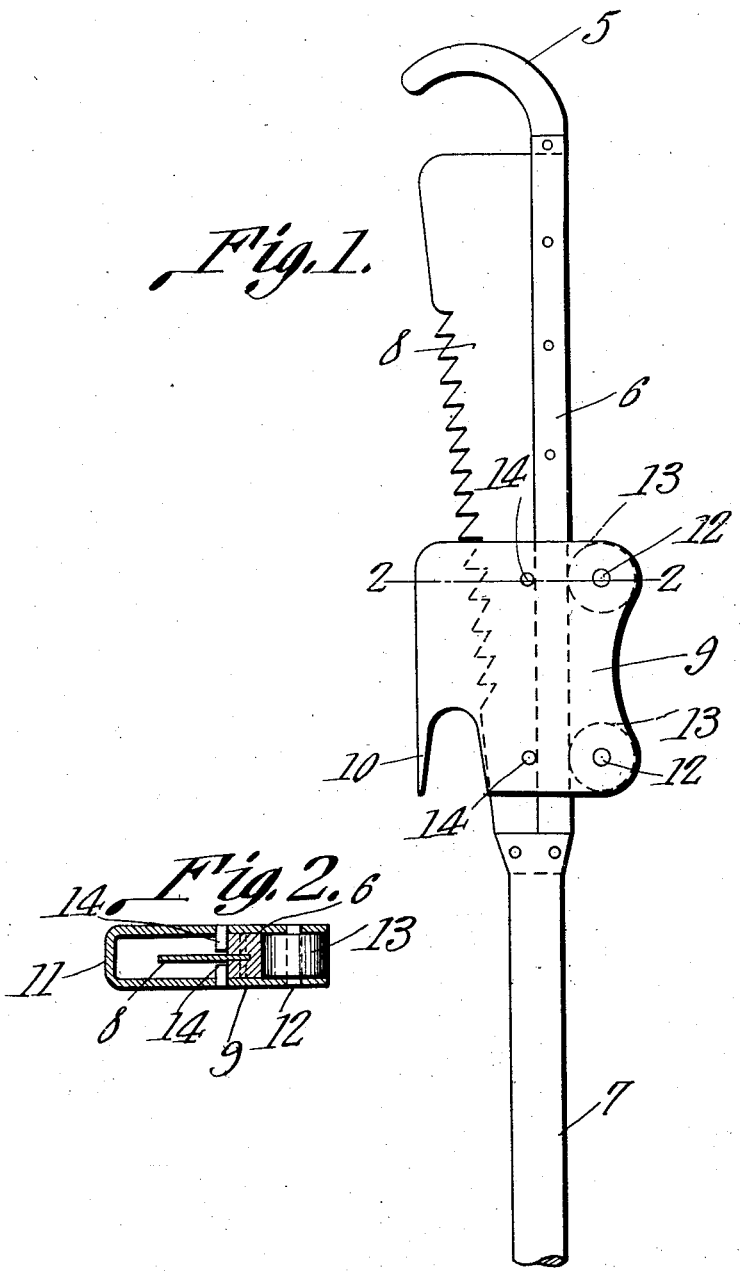

JOHN SWEGLES, OF WAYNE, MICHIGAN, ASSIGNOR OF ONE-THIRD TO ANTHONY A. SNYDER AND ONE-THIRD TO JOSEPH P. SNYDER, OF WAYNE, MICHIGAN.

PRUNING IMPLEMENT.

973,582.  Specification of Letters Patent.  Patented Oct. 25, 1910.

Application filed June 10, 1910. Serial No. 566,175.

*To all whom it may concern:*

Be it known that I, JOHN SWEGLES, a citizen of the United States, residing at Wayne, in the county of Wayne and State of Michigan, have invented a new and useful Pruning Implement, of which the following is a specification.

The present invention has for its object to provide a pruning implement which is so constructed that it may be used for cutting off large or small limbs or twigs, as may be required, and also to provide an implement of the kind stated which is simple in construction, and which can be easily operated.

The invention also has for its object to provide a saw, together with novel means for supporting the same when it is in operation.

With these objects in view, the invention consists in a novel construction and arrangement of parts to be hereinafter described and claimed, reference being had to the accompanying drawing forming a part of this specification, in which drawing—

Figure 1 is an elevation of the implement. Fig. 2 is a cross section on the line 2—2 of Fig. 1.

Referring specifically to the drawing, 5 denotes an ordinary pruning hook which is formed at the outer end of a shank 6 carried by a pole or handle 7 of suitable length. A short distance below the hook, the shank 6 is fitted with a tapered saw blade 8 which is employed for cutting off larger limbs, the hook 5 being employed for cutting small limbs or twigs.

On the shank 6 is slidably mounted a hook casing composed of spaced plates 9 located on opposite sides of the shank, and extending outwardly therefrom sufficiently to extend on opposite sides of the saw blade 8. At their lower ends, in front of the edge of the saw blade, the walls are hooked-shaped as indicated at 10, and said walls are also connected in front of the saw blade as indicated at 11. The walls 9 also project from the rear edge of the shank 6, and extending across said projecting portions are axles 12 on which are journaled rollers 13 which are located between said walls, and engage the rear edge of the shank. The walls 9 also carry inwardly projecting pins 14 which engage the front edge of the shank, 6 on opposite sides of the saw blade 8. The purpose of the rollers 13 and the pins 14 is to guide the hook casing along the shank, it being free to slide upwardly and downwardly thereon. Friction is reduced to a minimum by the rollers.

In operation, the hook 5 is used in the ordinary manner to cut small twigs and limbs. Large limbs will be severed by using the saw 8. The saw is guided when in use by means of the hook 10, the casing being placed at the lower end of the saw, and the hook being placed over the limb to be severed. A downward pull on the handle 7 operates the saw, the limbs being sawed off at one stroke. The widest portion of the saw is at its upper end, and the width at this end is sufficient to cut entirely across the limb over which the hook is engaged, when the said wide portion of the saw reaches the limb. After the limb has been sawed through, the hook casing slides downwardly to the lower end of the saw, and the implement is then ready for the next limb to be sawed off. The hook provides a support for the saw when it is in operation, and enables the implement to be operated with the greatest facility.

What is claimed is:

1. A pruning implement comprising a shank, a saw carried by the shank, a casing loosely mounted on the shank and having a hook located adjacent to the saw, rollers carried by the casing and engaging one edge of the shank, and pins extending from the casing into engagement with the other edge of the shank.

2. A pruning implement comprising a shank, a saw carried thereby, a casing comprising spaced walls between which the shank is received, said casing being loose on the shank, rollers between the walls of the casing, and one of the edges of the shank, pins extending from the casing into engagement with the other edge of the shank, and a hook on the casing located adjacent to the edge of the saw.

In testimony that I claim the foregoing as my own, I have hereto affixed my signature in the presence of two witnesses.

JOHN SWEGLES.

Witnesses:
JOHN S. EGELER,
JACOB J. STELLWAGEN.